United States Patent [19]

Karlen et al.

[11] 3,800,988

[45] Apr. 2, 1974

[54] ONE-PIECE SPOUT AND HANDLE STRUCTURE

[75] Inventors: Harvey R. Karlen; Ralph Eberstein, both of Chicago; Franz L. Herbsthofer, Wilmette, all of Ill.

[73] Assignee: Cory Corporation

[22] Filed: June 17, 1968

[21] Appl. No.: 737,405

[52] U.S. Cl. .............................. 222/465, 222/570
[51] Int. Cl. .............................................. A47g 19/14
[58] Field of Search .......... 222/465, 570, 566, 567; 220/94; 215/100.5; 294/31.2; 24/263.5, 249, 243.2

[56] References Cited
UNITED STATES PATENTS 2,101,287  12/1937  Tinnerman.................... 24/243.2
3,114,484  12/1963  Serio............................ 222/465
3,191,819  6/1965   Smith........................... 222/465
3,330,449  7/1967   Bloomfield et al. ........... 222/570 X

FOREIGN PATENTS OR APPLICATIONS 116,788  6/1918  Great Britain ................. 294/31.2

Primary Examiner—Robert B. Reeves
Assistant Examiner—Norman L. Stack, Jr.

[57] ABSTRACT

A decanter for dispensing a liquid, such as coffee, having a unitary spout and handle element mechanically interlocked to the neck of the decanter flask. The spout and handle element is secured by mechanical means constricting a portion thereof about the decanter neck and effecting a mechanical interlock of a portion of the spout and handle means with a cooperating portion of the decanter neck.

17 Claims, 11 Drawing Figures

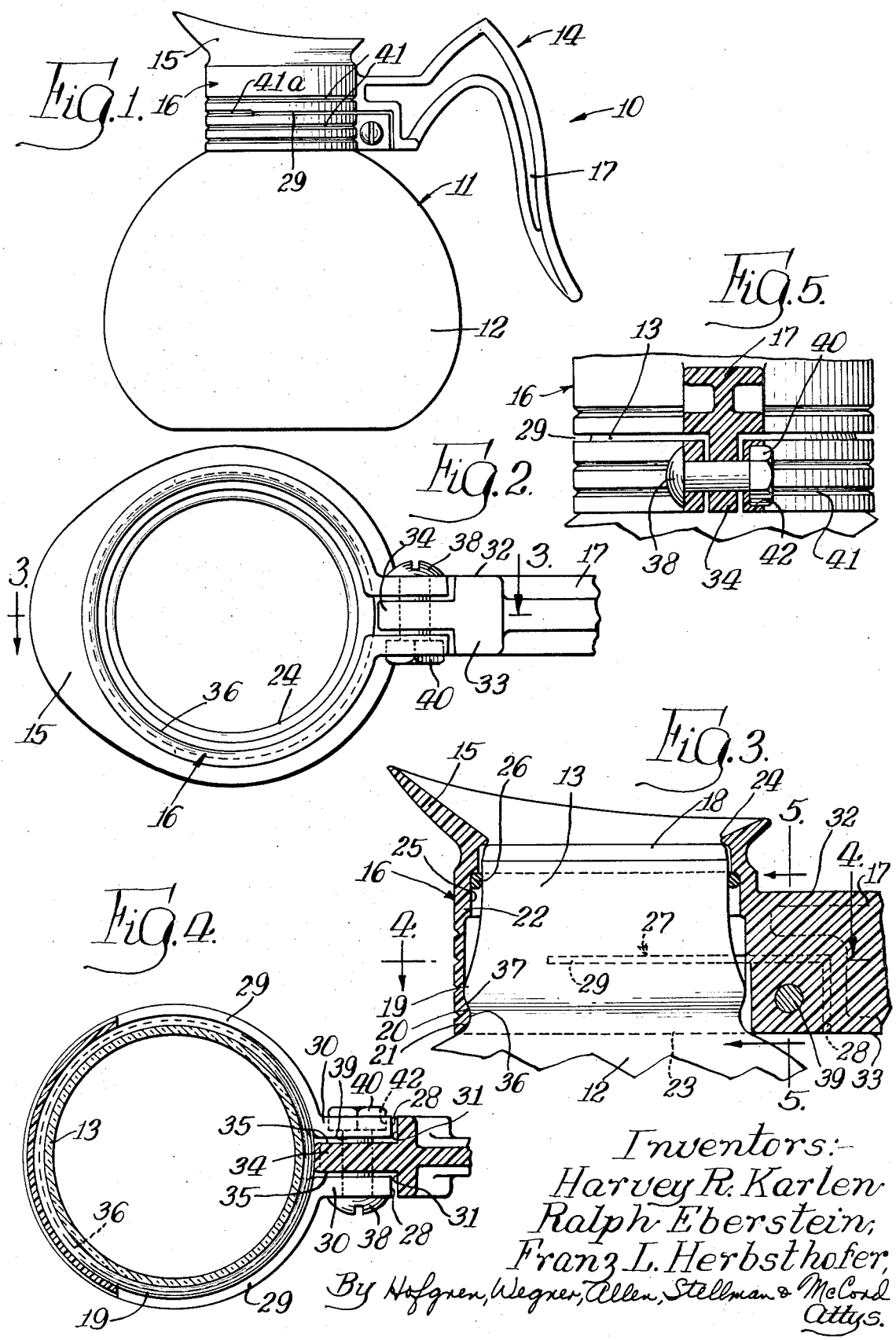

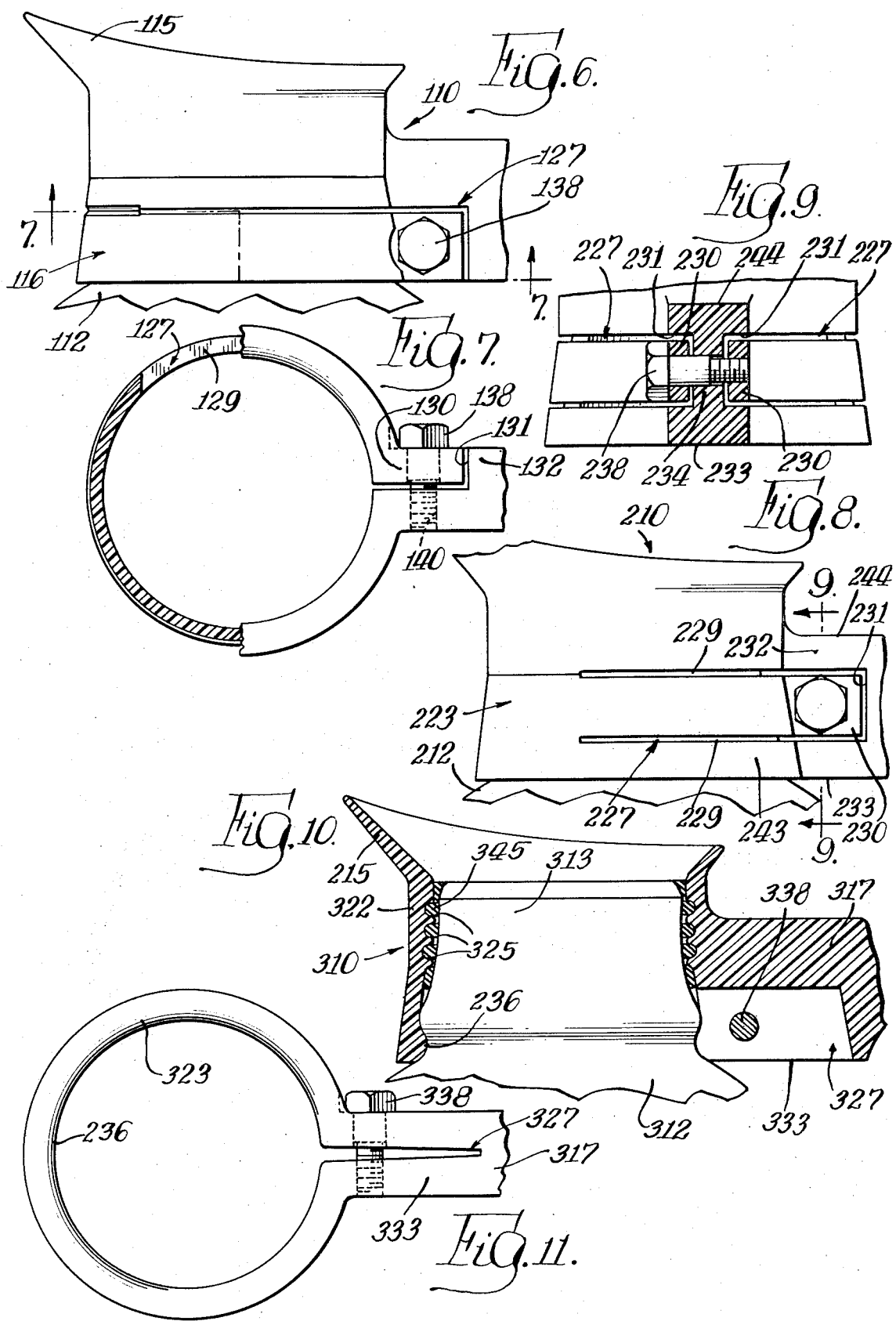

ONE-PIECE SPOUT AND HANDLE STRUCTURE

BACKGROUND OF THE INVENTION

1. Field of the Invention

This invention relates to liquid pouring means and in particular to liquid serving devices, such as decanters.

2. Description of the Prior Art

A conventional device for serving a liquid, such as coffee and the like, comprises a decanter flask having an upstanding neck. In one form, the neck is arranged to define a pouring spout and a handle structure is secured to the flask for manipulation thereof in effecting the filling and pouring operations.

In the conventional decanter of this type, the handle is secured to the decanter by a clamp band extending around the neck of the decanter and securing the handle to the flask. In one improved form of decanter, as shown and disclosed in U.S. Pat. No. 2,982,451 owned by the assignee hereof, a metal clamp band is provided which further serves to retain a separate pouring spout to the flask neck.

SUMMARY OF THE INVENTION

The present invention comprehends an improved liquid serving device having a unitary spout and handle element adapted to be retained on the upper tubular neck of a flask in a novel and simple manner. The spout and handle element may be of extremely simple and economical construction and in the illustrated embodiment comprises a one-piece molded plastic element. The spout and handle element is arranged to define means for constrictively encircling the flask neck and means for mechanically interlocking therewith to positively secure the handle to the flask. The invention comprehends providing a slotted portion of the spout and handle element defining means effecting the desirable securing thereof to the flask neck.

The handle element includes a spout portion disposed at the upper end of the flask neck when the element is mounted thereon for facilitated dispensing of a liquid, such as coffee and the like, from the flask.

The invention further comprehends providing means for sealing the spout and handle element to the flask neck.

Thus, more specifically, the invention comprehends a unitary spout and handle element for use in a liquid serving device having a flask provided with an upper tubular neck defining an upper end and downwardly directed shoulder means spaced below the upper neck end, wherein the element includes a tubular body having an upper continuously annular portion arranged to mount about the upper neck end, means on the upper body portion defining a pouring surface, a lower discontinuously annular portion arranged to mount about the neck below the upper body portion, shoulder means on the lower body portion for engaging the neck shoulder means, the discontinuous lower portion being sufficiently flexible to permit the shoulder means therein to be moved downwardly past the neck to subjacent the shoulder means and be subsequently urged into engagement with the neck shoulder means, and means defining a handle unitarily integral with the body.

Further, more specifically, the invention comprehends the provision in such a liquid serving device of means on the element for securing the body shoulder means subjacent the neck shoulder means to mechanically interlock the element to the neck.

Yet further, the invention more specifically comprehends the provision of such a liquid serving device wherein the element includes a securing portion adjacent the tubular body, the lower body portion includes a free end portion adjustably disposed adjacent the securing portion and the securing means defining means for forcibly juxtaposing the free end to the securing portion. The lower body portion may further include within the scope of the invention a second free end portion adjustably disposed adjacent the securing portion and the securing means further defines means for juxtaposing the second free end to the securing portion. The free portions may comprise opposite free ends of the lower body portion juxtaposed to opposite sides of the securing portion.

The invention still further comprehends more specifically a slotted body construction wherein the body portion includes a slot extending longitudinally from the lower end thereof and a transverse slot extending annularly from the upper end of the longitudinally extending slot less than 360° about the axis of the body.

The body portion may be provided with a pair of such slots extending from opposite sides of the handle means. Each of the pair of slots may extend less than 180°.

The invention further more specifically comprehends providing an improved compact arrangement wherein the free end of the lower body portion is recessed within a portion of the handle.

Still further, the invention more specifically comprehends a number of different arrangements of the slot means for providing the desirable facilitated mounting of the element on the flask neck.

The invention more specifically still further comprehends the provision of new and improved sealing of the unitary spout and handle element to the flask neck for drip-proof pouring of liquid from the flask.

BRIEF DESCRIPTION OF THE DRAWINGS

Other features and advantages of the invention will be apparent from the following description taken in connection with the accompanying drawings wherein:

FIG. 1 is a side elevation of a liquid serving device embodying the invention;

FIG. 2 is a fragmentary bottom view of the unitary spout and handle element with the securing means provided therewith;

FIG. 3 is a vertical section thereof taken substantially along the line 3—3 of FIG. 2;

FIG. 4 is a horizontal section thereof taken substantially along the line 4—4 of FIG. 3;

FIG. 5 is a vertical section taken substantially along the line 5—5 of FIG. 3;

FIG. 6 is a fragmentary side elevation of a modified form of liquid serving device embodying the invention;

FIG. 7 is a horizontal section thereof taken substantially along the line 7—7 of FIG. 6;

FIG. 8 is a fragmentary side elevation of still another form of liquid serving device embodying the invention;

FIG. 9 is a fragmentary vertical section thereof taken substantially along the line 9—9 of FIG. 8;

FIG. 10 is a fragmentary vertical section of still another form of liquid serving device embodying the invention; and FIG. 11 is a bottom plan view thereof.

DESCRIPTION OF THE PREFERRED EMBODIMENT

In the exemplary embodiment of the invention as disclosed in FIGS. 1-5 of the drawing, a liquid serving device, generally designated 10, is shown to comprise a decanter including a flask 11 having a bowl 12 and generally tubular neck portion 13 upstanding from the bowl portion 12. The invention comprehends the provision of a unitary spout and handle element, generally designated 14, mounted on the flask neck 13. More specifically, the spout and handle element 14 includes an upper spout portion 15, a tubular body portion generally designated 16, and a handle portion 17. The element 14 herein comprises a one-piece structure wherein the portions 15, 16 and 17 are integrally formed as by molding of the element from a suitable plastic such as polyethylene.

As best seen in FIG. 3, the flask neck 13 includes an upper end 18 and an annular radially enlarged portion 19 spaced below upper end 18 and defining a downwardly facing shoulder 20. The shoulder 20 effectively comprises the upper portion of a reentrant surface annular recess 21.

The tubular body portion 16 of the element 14 includes an upper continuously annular portion 22 and a lower discontinuously annular portion 23 disposed subjacent the upper portion 22 to extend about the neck 13 subjacent the lower portion 19 of the neck 13.

As shown in FIG. 3, the spout 15 projects upwardly from the upper portion 22 and includes an inturned flange 24 engaging the upper end 18 of the neck to define a seal therewith. To augment the seal of the flange 24 with the neck 13, the upper body portion 22 is provided with a radially inwardly and axially downwardly opening recess 25 spaced below the flange 24 and adapted to receive therein an annular O-ring 26 which is sealingly compressed between the upper body portion 22 and the neck 13.

The lower portion 23 of the body portion 16 is made discontinuously annular by providing a pair of slots 27, each of which includes a longitudinally extending portion 28 and a transverse portion 29. As best seen in FIGS. 2 and 4, the slot portions 29 may extend less than 180° from the slot portions 28 and the free ends 30 of the lower body portion 23 defined by the slots comprise tab portions 30 received in oppositely opening recesses 31 in a base 32 of the handle 17 integrally formed with the tubular body portion 16 to extend radially outwardly therefrom. The slot portions 28 extend from the bottom 33 of the handle base portion 32 less than fully upwardly therethrough and in the illustrated embodiment, as shown in FIG. 3, extend upwardly approximately one-half the height thereof. The recesses 31 effectively define a thin web 34. The body portion free ends 30 are juxtaposed to the opposite sides 35.

The lower body portion 23 further defines a radially inwardly projecting annular bead 36 adapted to be received in the recess 21 of the flask neck 13 and defining an upwardly facing upper shoulder portion 37 which engages the downwardly facing shoulder 20 defined by the upper portion of recess 21. Means for securing the element 14 to the flask neck 13 are provided in the form of bolt 38 including a shank 39 extending through the respective tabs 30 and web 34, and a nut 40 threadedly secured to the end of the shank 39, as shown in FIGS. 2 and 4.

Thus, by tightening the securing means 38,40, the tabs 30 are drawn together toward web 34 thereby constricting the lower body portion 23 about the flask neck 13 and effectively positively bringing the bead 36 into interlocked relationship with the neck 13 in the recess 21 thereof. As the lower body portion 23 is expandable as a result of the provision of the slots 27, as well as the flexibility thereof, the body portion 16 may be readily telescoped into the neck 13 to the position of FIG. 3 with the securing means 38, 40 in a loose condition. The element 14 is then effectively positively secured to the flask neck by the simple tightening of the securing means as discussed above.

As best seen in FIGS. 1 and 5, the tubular body portion 16 may be provided with a plurality of annular outwardly opening grooves 41. One such groove 41a extends between the outer ends of the slots 27 and thus the presence of the slot portion 29 is effectively hidden to enhance the aesthetic charcteristics of the element 14. As shown in FIG. 1, the handle 17 may be provided with a surface configuration further enhancing the aesthetic characteristics of the element 14. As the element 14 may be formed by molding, such surface structures for improved aesthetic effect may be readily provided as desired. For further improved aesthetic effect, at least one of the tabs 30 may be provided with a recess for receiving the projecting portion of the securing means. Thus, as shown in FIG. 4, one of the tabs 30 may be provided with a recess 42 at least partially receiving the nut 40. As shown in FIG. 5, the recess 42 may have a cross-section similar to the outside configuration of the nut 40 so as to serve as means for holding the nut against rotation during threading of bolt 38 therein.

The unitary construction of the spout and handle element 14 provides improved maintenance facility. As the elements of the device are maintained integral, the device may be readily installed and removed relative to the flask neck and may be readily maintained as by normal cleaning methods. As the recess 25 opens axially, the O-ring 26 may be readily removed and installed as desired for further facilitated maintenance.

While the discontinuously lower body portion 23 permits facilitated installation of the element 14 on the flask neck, effectively positive retention thereon is obtained by the improved constriction and mechanical interlock means discussed above provided by the slotted structure and cooperative securing means.

Turning now to FIGS. 6 and 7, a modified form of liquid serving device, generally designated 110, is shown to comprise a device generally similar to device 10 but having a lower body portion 116 provided with a single slot 127 wherein the transverse portion 129 extends from a single tab portion 130 with the handle base portion 132 being provided with a single recess 131 extending approximately one-half the width of the base portion 132, as shown in FIG. 7. Thus, the device 110 provides the desirable flexible constrictive mounting on the flask neck.

As illustrated in FIG. 7, the securing means may comprise a bolt 138 which is threaded into a threaded hole 140 in the base portion 132.

In FIGS. 8 and 9, another modified liquid serving device, generally designated 210, is shown to comprise a device generally similar to device 10 but wherein the slot 227 includes a pair of spaced transverse portions 229 and the lower body portion 223 includes a continuously annular bottom section 243 whereby the tab 230 may be received in a recess 231 spaced above the bottom 233 of the handle base 232 and, more specifically, intermediate the bottom 243 and top 244 thereof. As shown in FIG. 9, a pair of slots 227 may be provided extending from opposite sides of the web 234 and the bolt 238 may be threaded into the web to effect the desired securing of the device 210 to the flask neck. As will be obvious to those skilled in the art, the different forms of securing devices illustrated in the different embodiments may be utilized interchangeably therein within the scope of the invention.

In FIGS. 10 and 11, another form of liquid serving device, generally designated 310, is shown to comprise a device generally similar to device 10, but having a slot 327 which does not extend transaxially into the annular lower body portion 323. Rather, as shown, the slot extends upwardly from the bottom surface 333 of the handle base approximately one-half the height thereof and narrows from the lower body portion 323 into the handle 317. The securing means bolt 338 may be threaded into the far half of the base portion, as shown in FIG. 11, to effect the desired constriction and formation of the mechanical interlock of the device 310 relative to the decanter neck.

The liquid serving devices of the invention may be provided with another form of sealing means in lieu of the O-ring 26, as illustrated in FIG. 10, wherein the upper body portion 322 is provided with a plurality of radially inwardly opening grooves 325. The upper body portion 322 has an internal diameter slightly larger than the outer diameter of the flask neck 313 whereby a body of plastic 345 may be set therein to effectively seal the device 310 to the flask neck 313. Illustratively, the set plastic may comprise a set body of a suitable epoxy resin. The grooves 325 extend continuously annularly whereby the plastic 345 set in situ therein effectively defines an improved annular seal of the device 310 to the flask neck.

Except as otherwise noted above, each of the devices 110, 210 and 310 is similar to the liquid serving device 10. Similar portions thereof are identified by similar reference numerals but 100 different.

Thus, the invention comprehends an improved liquid serving means wherein a unitary spout and handle element is provided for facilitated installation on the neck of a decanter flask. The devices of the illustrated embodiments are extremely simple and economical of construction while providing the highly desirable features discussed above.

While we have shown and described one embodiment of our invention, it is to be understood that it is capable of many modifications.

We claim:

1. For use in a liquid serving device having a flask provided with an upper tubular neck defining an upper end and downwardly directed neck shoulder means spaced below said upper end, a one-piece spout and handle element comprising: a tubular body having an upper continuously annular portion arranged to mount about said upper neck end, means on said upper body portion defining a pouring surface, a lower discontinuously annular portion below said upper body portion arranged to mount about said neck, and body shoulder means on said lower body portion for engaging said neck shoulder means, said discontinuous lower portion being sufficiently flexible to permit said body shoulder means therein to be moved downwardly past said neck to subjacent said neck shoulder means and be subsequently urged into engagement with said neck shoulder means; and means defining a handle unitarily integral with said body.

2. The liquid serving device of claim 1 wherein said unitary spout and handle element is formed of molded plastic.

3. The liquid serving device of claim 1 further including means on said element for securing said body shoulder means adjacent said neck shoulder means to mechanically interlock said element to said neck.

4. The liquid serving device of claim 3 wherein said element includes a securing portion adjacent said tubular body, said lower body portion includes a free end portion adjustably disposed adjacent said securing portion and said device further includes means on said element for securing said body shoulder means subjacent said neck shoulder means to mechanically interlock said element to said neck, said securing means comprising means for forcibly juxtaposing said free end to said securing portion.

5. The liquid serving device of claim 4 wherein said lower body portion further includes a second free end portion adjustably disposed adjacent said securing portion and said securing means further defines means for juxtaposing said second free end to said securing portion.

6. The liquid serving device of claim 3 wherein said element includes a securing portion adjacent said tubular body, said lower body portion includes a pair of free ends adjustably disposed adjacent on opposite sides of said securing portion and said device further includes means on said element for securing said body shoulder means subjacent said neck shoulder means to mechanically interlock said element to said neck, said securing means comprising means for forcibly juxtaposing said free ends to said opposite sides of said securing portion.

7. The liquid serving device of claim 3 wherein said securing means comprises means for constricting said discontinuous lower body portion about said neck.

8. The liquid serving device of claim 1 wherein said lower body portion includes a slot extending longitudinally from the lower end thereof and a transverse slot extending annularly from the upper end of said longitudinally extending slot less than 360° about the axis of said body.

9. The liquid serving device of claim 8 wherein said lower body portion includes a pair of said longitudinally extending and transverse slots, said longitudinally extending slots being disposed adjacent opposite sides of the handle means.

10. The liquid serving device of claim 9 wherein each of said transverse slots extends less than 180°.

11. The liquid serving device of claim 1 wherein said handle defines a recess and said lower body portion includes a free end adjustably received in said recess for adjustably constrictively disposing said lower body portion about said neck.

12. The liquid serving device of claim 1 wherein said lower discontinuously annular portion further includes a continuously annular lowermost section.

13. The liquid serving device of claim 1 wherein said discontinuous lower portion is defined by a slot extending longitudinally upwardly from the bottom thereof and outwardly into said handle means.

14. The liquid serving device of claim 13 wherein said slot extends less than fully upwardly through said handle means.

15. The liquid serving device of claim 1 wherein said upper body portion defines a radially inwardly and longitudinally downwardly opening continuously annular recess for receiving continuously annular means for sealing the element to said neck.

16. The liquid serving device of claim 1 wherein said lower body portion is provided with at least one radially outwardly opening discontinuously annular groove.

17. The liquid serving device of claim 1 wherein said upper body portion is provided with at least one radially inwardly opening continuous annular groove and said device further includes a body of plastic material set in situ therein for sealing said body to said neck.

* * * * *